United States Patent [19]

Kodokian

[11] Patent Number: 5,340,428
[45] Date of Patent: Aug. 23, 1994

[54] METHOD FOR INDUCTION HEATING OF COMPOSITE MATERIAL

[75] Inventor: George R. Kodokian, Wilmington, Del.

[73] Assignee: E. I. Du Pont de Nemours and Company, Wilmington, Del.

[21] Appl. No.: 980,318

[22] Filed: Nov. 20, 1992

Related U.S. Application Data

[60] Continuation of Ser. No. 774,787, Oct. 10, 1991, abandoned, which is a division of Ser. No. 738,220, Jul. 30, 1991, Pat. No. 5,248,864.

[51] Int. Cl.[5] .............................................. B32B 31/00
[52] U.S. Cl. .............................. 156/272.2; 156/272.4; 156/275.5; 219/634
[58] Field of Search ............... 156/272.4, 272.2, 275.5; 219/6.5, 10.41, 10.53

[56] References Cited

U.S. PATENT DOCUMENTS

| | | |
|---|---|---|
| 3,391,846 | 7/1968 | White .......................... 156/272.4 X |
| 3,960,629 | 6/1976 | Goldsworthy ................ 156/272.4 X |
| 4,067,765 | 1/1978 | Heller, Jr. et al. ................ 156/272.4 |
| 4,521,659 | 6/1985 | Buckley et al. ............... 156/272.4 X |
| 4,859,524 | 8/1989 | Kim et al. .................... 156/272.4 X |
| 4,871,412 | 10/1989 | Felix et al. ........................ 156/273.9 |
| 4,878,978 | 11/1989 | Goel et al. ........................ 156/272.4 |
| 4,908,088 | 3/1990 | Boyd et al. ........................ 156/307.3 |
| 4,969,968 | 11/1990 | Leatherman ..................... 156/272.4 |
| 4,978,825 | 12/1990 | Schmidt et al. .................. 219/104.3 |
| 5,208,443 | 5/1993 | McGaffigan ..................... 156/272.4 |
| 5,248,864 | 9/1993 | Kodokian ......................... 219/10.41 |

Primary Examiner—Chester T. Barry

[57] ABSTRACT

A method for heating a composite comprising a nonconductive material that is a thermoplastic or a thermoset reinforced with conductive materials such as carbon fibers, by incorporating coupling particles in the structure. The structure is oriented in the plane of a magnetic field induced at frequencies from 3 kHz to 7 MHz, whereby the coupling particles respond as susceptors to the induced magnetic field and are preferentially heated (carbon fibers are not heated).

11 Claims, 2 Drawing Sheets

METHOD FOR INDUCTION HEATING OF COMPOSITE MATERIAL

This is a continuation of application Ser. No. 07/774,787 filed Oct. 10, 1991, now abandoned, which is a division of application Ser. No. 07/738,220 Jul. 30, 1991, now U.S. Pat. No. 5,248,864.

BACKGROUND OF THE INVENTION

This invention relates to a method for heating a fiber reinforced resin material by magnetic induction and, more particularly, it relates to a method for selectively heating a resin composite reinforced with an electrically conductive fiber by magnetic induction without substantially heating the electrically conductive fiber.

U.S. Pat. No. 4,871,412 discloses a method of bonding a thermoplastic layer to a substrate, the thermoplastic layer contains electrical conductive fibers such as carbon fibers which are heated by inducing electric currents into the fibers at frequencies in the frequency range of 3–4 MHz. At the frequency range involved, it is believed by the patentee that sufficient voltage is induced in the carbon fiber to cause breakdown between fibers, between adjacent layers and possibly within one layer such that circulating eddy currents heat the carbon fibers which brings the thermoplastic up to a softening or fusion temperature.

U.S. Pat. No. 2,393,541 discloses that by properly selecting finely divided metal particles and alloys having ferromagnetic properties, the heating temperature in the presence of a high frequency magnetic field may be readily limited and controlled to the particular temperature or temperature range necessary for the heat-treating of materials such as glue, adhesives or plastics. When any of the various metals or alloys of the ferromagnetic class become heated to a particular temperature, known as the Curie point therefor, then the ferromagnetic qualities cease. As a result, any further application of a high frequency field is substantially ineffective to cause further heating if the particles are small. Masses of metal of substantial size may be heated by magnetic induction due to the setting up of eddy currents, as well as because of hysteresis effects in the case of metals of the ferromagnetic class. The patentee discloses that since the ferromagnetic particles are finely divided and effectively insulated from each other by the adhesive or other dielectric material mixed therewith, there is no substantial heating above the Curie point due to eddy currents and that particles may be chosen such that the heating effect is discontinued upon reaching the Curie point for the particles so that the non-conductive material is protected against damage if it is of the nature of damage that might occur by more prolonged heating without a further temperature rise.

SUMMARY OF THE INVENTION

The invention involves a method for selectively heating a composite structure comprising a nonconductive material such as a thermoplastic resin reinforced with conductive materials such as carbon fibers, by associating with the composite structure with a preferential heating material having characteristics of high magnetic permeability, high hysteresis loss loop and a Curie temperature point near the melting or curing temperature of the resin material, and subjecting the structure to an external magnetic flux induced with frequencies of about 3 kHz to 7 MHz, whereby the preferential heating material respond as a susceptor to the flux field and is preferentially heated and thereby heating the composite structure to the desired or selected temperature.

The principles of this invention may be used in connection with bonding operations or in molding or shaping operations.

Only the preferential heating material is heated by the induction field; neither the resin nor the carbon fibers are substantially heated by the magnetic lines. The structural integrity of the reinforcing fibers and the plastic to give the high performance characteristics of the composite is not damaged—as can be the situation if the carbon fibers themselves were susceptors and heated by the external source.

A key aspect of the method when high frequencies are used to induct magnetic fields is to orient the composite structure and associated preferential heating material so that they are within and aligned with the plane of the induced magnetic field whereby circulating eddy currents will not substantially heat the electrical conductive fibers to cause overheating of the material.

The preferential heating material preferably is in the form of magnetic particles. However, other forms of the material such as foils and screens are also satisfactory for use.

DETAILED DESCRIPTION OF THE ILLUSTRATED EMBODIMENT

Figure 1:
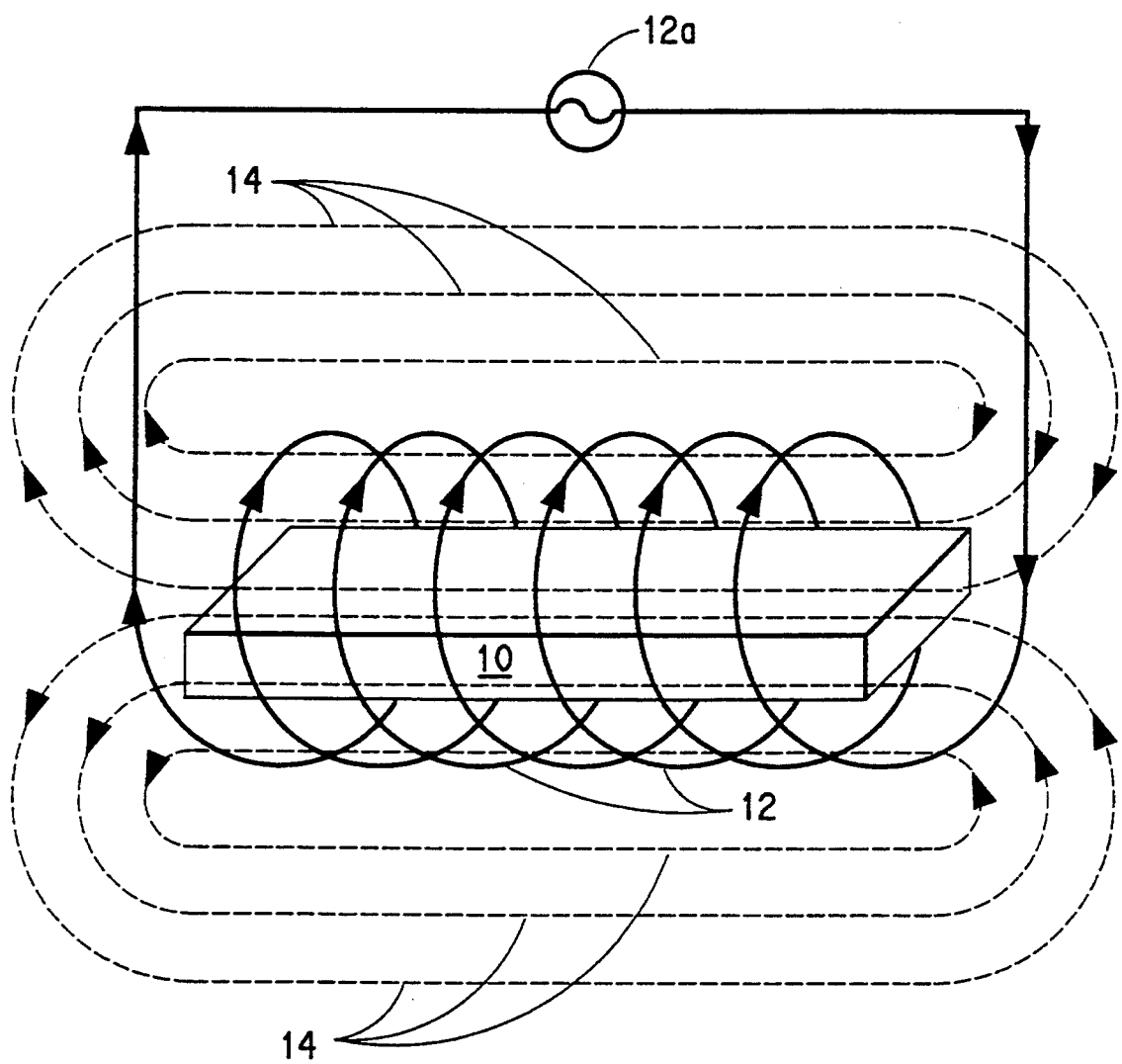
FIG. 1 is a schematic illustration of a composite structure oriented within an induced magnetic field.
Figure 2:
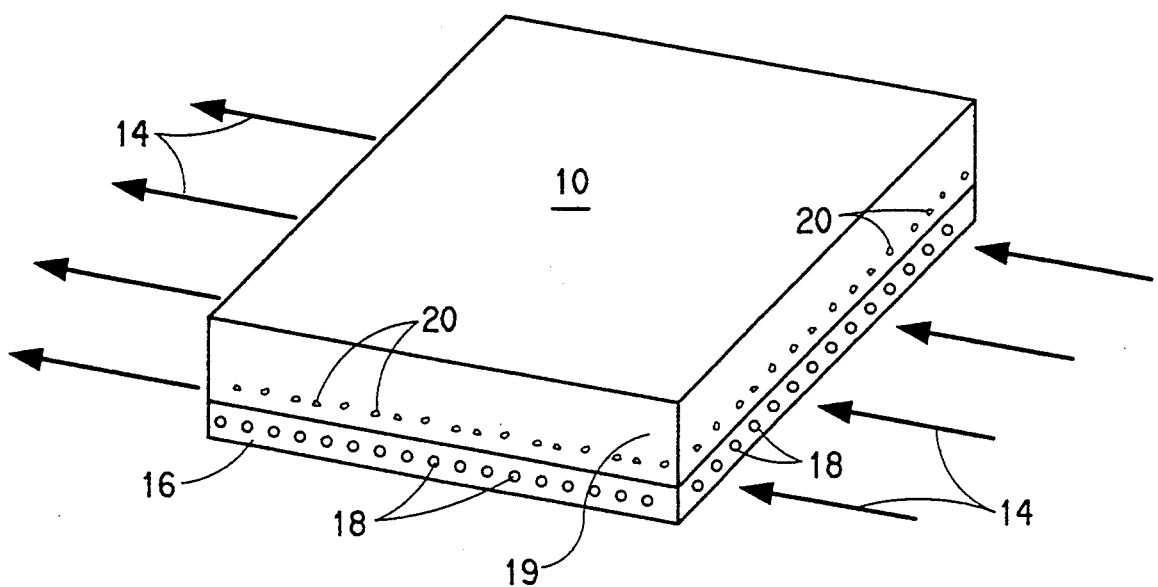
FIG. 2 is an enlarged view of a portion of FIG. 1 showing more detail of the composite within the induced magnetic field.
Figure 3:
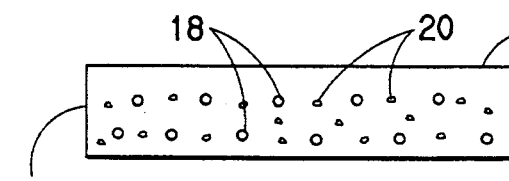
FIGS. 3–6 show alternate locations of particles coupled with the magnetic field and associated with the composite structure.

In the embodiment shown for purposes of illustration in FIGS. 1 and 2, a composite structure 10 is surrounded by a coil 12 energized by an induction generator 12a with an instantaneous electrical current flowing in the direction of the arrows. The energized coil generates an instantaneous induced magnetic field of flux 14 that surrounds the composite structure 10 which is substantially aligned with the plane of the induced magnetic field 14. As best shown in FIG. 2, the composite structure 10 comprises a resin matrix 19 reinforced with electrical conductive material 20 such as carbon fiber. Preferably the carbon fiber is in a two dimensional planar array within the resin material. Associated with the lower surface of composite structure 10 is a layer of resin film 16 having a plurality of coupling particles 18 embedded in the film. As used herein, a coupling particle is either a magnetically conductive particle or an electrical charge carrier when an electrical current is applied. In general, all metallic particles are conductive particles. Preferably the coupling particles are magnetic with a Curie temperature and a hysteresis loop.

Figure 5:
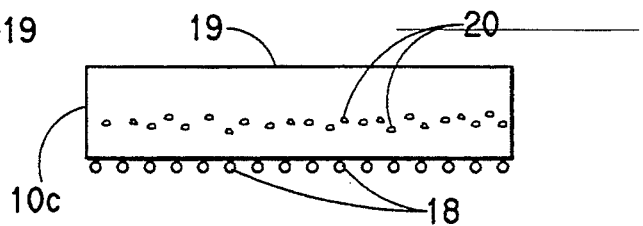
Figure 4:
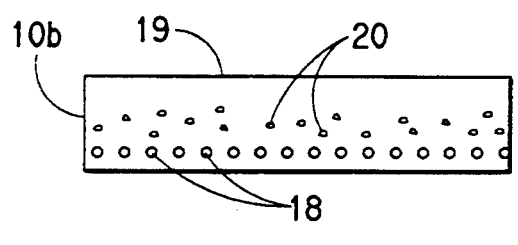
Figure 6:
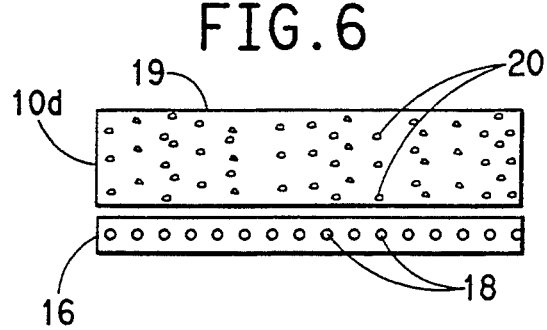

FIGS. 3–6 show embodiments of different arrangements for associating coupling particles 18 with a composite structure 10. More particularly, in FIG. 3 the coupling particles 18 are within the composite structure 10a mixed with the electrical conductive fibers 20. In FIG. 4 the coupling particles 18 are located close to one surface but within composite structure 10b. In FIG. 5 the coupling particles 18 are on the surface of composite structure 10c and in FIG. 6 the coupling particles 18 are embedded in a film 16 which is located adjacent a surface of composite structure 10d.

In operation, a high frequency alternating current is applied to coil 12 which in turn generates a magnetic field 14 in accordance with known magnetic circuit principles. The field 14 is shown oriented in substantially one plane. The composite structure is oriented in the plane of the magnetic field providing for efficient hysteresis heating of the particles which in turn leads to selective heating of the areas of the composite structure associated with the particles and inefficient or substantially no heating of the electrical conductive fibers because the area of the conductive fibers exposed to the magnetic lines of flux 14 is small which tends to confine circulating eddy currents within the individual fibers rather than between fibers, thus minimizing heat generated thereby.

EXAMPLE I

In a series of tests to show the effect of frequency and orientation within an induced magnetic field on heating of a resin reinforced with an electrically conductive fiber and a resin containing particles capable of coupling with the magnetic field, the following 1"×1" samples of composites were made and tested. The composites were polyetherketoneketone (PEKK) resin and polyetheretherketone (PEEK) resin, both reinforced with AS-4 carbon fibers of a nominal diameter of 8 μm. In the PEKK and PEEK composites the volume fraction of carbon fibers was 60% of the laminate. The fibers were either unidirectional, quasi-isotropic or in woven fabric in the laminates.

A variety of types and sizes of coupling particles separately mixed were in a Hysol Dexter Epoxy Patch 0151 adhesive to make a series of films 0.05" thick.

Each of the PEEK and PEKK composites and each of the adhesive films containing coupling particles were individually placed in induction coils 2" in diameter made from ¼" copper tubing and exposed to induced magnetic fields generated at various frequencies by the following induction generators:

AJAX induction generator, made by AJAX Corporation in Cleveland, Ohio, is a 15 kW, 3–10 KHz frequency generator.

Ameritherm induction generator, made by Ameritherm, Inc. in Scottsville, N.Y., is a SP-15 type, 15 kW, 50–200 KHz frequency generator.

Cycle Dyne induction generator, made by Cycle Dyne Corporation in Jamaica, N.Y., is an EA-30 type, 2 kW, 2–7 MHz frequency generator.

The conditions and the amount of heating of the composites and the adhesive films are shown in Tables I and II, respectively.

TABLE I

| | COMPOSITE HEATING | | | | |
|---|---|---|---|---|---|
| Composite Type | Position to Magnetic Lines | Frequency (KHz) | Power (kW) | Time (Sec) | Temperature (°C.) |
| 12-ply PEEK Quasi | Normal | 6 | 10 | 160 | 23 |
| 12-ply PEKK Quasi | 0° | 6 | 10 | 160 | 23 |
| 24-ply PEKK Quasi | Normal | 6 | 10 | 160 | 25 |
| 12-ply PEKK Quasi | Normal | 82 | 7 | 10 | 250 |
| 16-ply PEKK Unidirectional | Normal | 82 | 7 | 120 | 50 |
| 12-ply PEKK Quasi | 0° | 82 | 7 | 120 | 35 |
| 12-ply PEEK Quasi | 0° | 82 | 7 | 120 | 23 |
| 12-ply PEEK Quasi | Normal | 82 | 7 | 10 | 170 |
| 12-ply PEEK Unidirectional | 0° | 82 | 7 | 120 | 50 |
| 12-ply PEKK Unidirectional | Normal | 82 | 7 | 120 | 50 |
| 12-ply PEKK Quasi | Normal | 4,500 | 0.25 | 10 | 340 |
| 12-ply PEKK Quasi | 0° | 4,500 | 0.25 | 60 | 38 |
| 24-ply PEKK Quasi | Normal | 82 | 7 | 5 | 245 |
| 24-ply PEKK Quasi | 0° | 82 | 7 | 100 | 38 |
| 1-ply PEEK Unidirectional | Normal | 82 | 7 | 120 | 25 |
| 1-ply PEKK Unidirectional | Normal | 82 | 7 | 120 | 25 |
| 1-ply PEKK Woven | Normal | 123 | 4 | 10 | 200 |
| 1-ply PEKK Woven | 0 | 123 | 4 | 120 | 28 |
| 8-ply PEKK Quasi* | Normal | 123 | 4 | 210 | 140 |
| 8-ply PEKK Quasi | Normal | 123 | 4 | 50 | 370 |
| 8-ply PEKK Woven | Normal | 82 | 7 | 20 | 370 |
| 8-ply PEKK Woven | 0 | 82 | 7 | 60 | 55 |
| 12-ply PEKK Quasi LDF (TM) | Normal | 82 | 7 | 10 | 190 |
| 12-ply PEKK Quasi LDF (TM) | 0 | 82 | 7 | 120 | 30 |

*Volume fraction of carbon fibers is 40%. Note that all other laminates have a volume fraction of carbon fibers of 60%.

It was noted that:

for low frequencies (6 KHz) the direction of the magnetic line is less critical since, for example, composites of the order of 24-ply thickness and less do not heat up;

high frequencies heat quasi-isotropic and woven laminates very rapidly if the magnetic lines are normal to the direction of fibers;

at frequencies below 4.5 MHz, carbon-fiber reinforced laminates do not heat up provided the magnetic lines are at 0° with the conductive reinforcing fiber; and therefore, as long as the fibers are in a two-dimensional configuration in a composite and this two-dimensional plane is 0° to induced magnetic lines, then the composite will not heat up by eddy currents.

TABLE II

| | HEATING OF CPs (COUPLING PARTICLES) | | | | | |
|---|---|---|---|---|---|---|
| CP | Weight (%) | Relative Magnetic Permeability | Size (μm) | Frequency (KHz) | Power (kW) | Time (Sec) | Temperature (°C.) |
| Iron | 50 | 200 | <5 | 6.5 | 10 | 100 | 100 |

TABLE II-continued
HEATING OF CPs (COUPLING PARTICLES)

| CP | Weight (%) | Relative Magnetic Permeability | Size (μm) | Frequency (KHz) | Power (kW) | Time (Sec) | Temperature (°C) |
|---|---|---|---|---|---|---|---|
| Nickel | 50 | 100 | <5 | 64 | 6.4 | 30 | 120 |
| Nickel | 50 | 100 | <60 | 64 | 6.4 | 30 | 180 |
| Manganese-ferrite | 66 | 1 | <5 | 88 | 5.5 | 15 | 120 |
| Iron | 50 | 50 | <5 | 129 | 2 | 70 | 205 |
| Nickel | 5 | 100 | <5 | 129 | 2 | 30 | 30 |
| Nickel | 30 | 100 | <5 | 129 | 2 | 90 | 90 |
| Nickel | 50 | 100 | <5 | 129 | 2 | 30 | 235 |
| Magnetic oxide | 30 | >10 | <1 | 129 | 2 | 30 | 80 |
| Magnetic oxide | 50 | >10 | <1 | 129 | 2 | 30 | 280 |
| Magnetic oxide | 50 | >10 | <1 | 85 | 6.5 | 16 | 350 |
| Manganese-ferrite | 50 | 1 | <5 | 88 | 5.5 | 15 | 30 |
| Manganese-ferrite | 50 | 1 | <5 | 4,500 | 0.25 | 4 | 100 |
| Manganese-ferrite | 66 | 1 | <5 | 4,500 | 0.25 | 4 | 220 |
| Magnetic oxide | 50 | >10 | <1 | 4,500 | 0.25 | 10 | 220 |

It was noted from the results of Table II that:
bigger size CPs heat up faster;
higher loading of CPs yields higher temperatures;
higher frequencies heat the CPs faster and higher;
larger magnetic hysteresis loss loop and/or
higher magnetic permeability gives higher temperatures.

EXAMPLE II

An eight turn round coil of ¼" copper tubing, inside diameter of coil was 2.5", was energized by an Ameritherm generator (tuned at 85 KHz, power 6.12 kW).

Magnetic oxide CPs were mixed in PEKK 60:40 thermoplastic neat resin film. The size of the CPs was in the submicron range and CP concentration was 70% by weight. A coupling film was made and its thickness was 0.04". Two 0.125"×1"×6" laminates in a single overlap configuration with 1" overlap and the coupling film sandwiched in the overlap region of the material.

The laminates were 12-ply quasi-isotropic AS-4/PEKK. The PEKK resin was 70:30 type and the volume fraction of the continuous carbon-fibers was 60%. The laminates were positioned such that the plies were 0° to the induced magnetic lines, and the overlap region was put under a 40 psi pressure.

A joint was made in 16 seconds. The temperature in the composite film reached 340° C. whereas the temperature of the composite laminate reached 200° C. due to heat conduction.

Since it was shown in Example I that the composite does not heat up when positioned to 0° to the magnetic lines, the reason that the composite heats up here is due to heat conduction from the coupling film.

The tensile shear strength was 1,100 psi as determined by ASTM standard D3163.

EXAMPLE III

In a series of tests to show the effect of an induced magnetic field on heating of a resin reinforced with an electrically conductive fiber composite associated with a foil or screen, the composites were plies of polyetherketoneketone resin reinforced with AS-4 continuous carbon fibers arranged in a quasi-isotropic form. The volume fraction of the carbon fibers was 60% of each ply. The layup of the laminate plies was (+45°/−45°/90°/0°)NS. In each test a foil or a screen was sandwiched between 8 ply layers of the composite. Each of the sandwiches described above were placed in an induction coil and heated in a fashion similar to that described in Example I. The conditions and amount of heating for foils and wire screen are shown in Table III and IV, respectively.

TABLE II

| Foils | Thickness μm | Frequency kHz | Power kW | Time s | Bondline Temperature °C. | Composite Temperature °C. |
|---|---|---|---|---|---|---|
| Co-nectic AA | 50 | 165 | 0.4 | 4 | 343 | 148 |
| Aluminum | 2 | 122 | 2.5 | 75 | 205 | 121 |

EXAMPLE IV

A six turn rectangular coil of ¼" square copper tubing (4"×2") was energized by an Ajax generator (tuned at 4.6 kHz, power 14 kW). The coil had flux concentrators on the bottom side of the coil to direct the magnetic lines to the coupling film under the coil.

A coupling film was made by sandwiching a copper screen of mesh 40×40 and size 1.6"×6" in between 8 mil pyromellitic diethyl ester diacid/1,4-bis(4-aminophenoxy)-2-phenylbenzene mixtures (Avimid® K) neat resin films. Two 0.06"×6"×6" laminates were put together in a single overlap configuration with 1.6" overlap and the coupling film was sandwiched in the overlap region of the laminates. The whole assembly was then put under the coil.

The laminates were 12-ply unidirectional carbon fiber Avimid® K. The volume fraction of the carbon fibers was 60%. The laminates were positioned under the coil and the overlap region was subjected to the 15 psi pressure.

A joint was made in 12 seconds. The temperature in the coupling film reached 360° C. whereas the temperature of the composite laminate reached 190° C. due to heat conduction.

The tensile shear strength was 3,200 psi as determined by ASTM standard D3163.

TABLE IV

| Wire Screen | Wire Dia. mm | Mesh Size | Open Area % | Power kW | Frequency kHz | Time s | Bondline Temperature °C. | Composite Temperature °C. |
| --- | --- | --- | --- | --- | --- | --- | --- | --- |
| Copper | 0.71 | 8 × 8 | 64 | 11 | 4.8 | 47 | 428 | 255 |
| Stainless Steel | 0.58 | 12 × 12 | 51.8 | 11 | 4.6 | 17 | 141 | 95 |
| Steel | 0.25 | 40 × 40 | 36 | 11 | 4.6 | 25 | 211 | 129 |
| Copper | 0.25 | 40 × 40 | 36 | 11 | 4.6 | 48 | 323 | 196 |
| Stainless Steel Perforated | 0.86 | | 41 | 11 | 4.6 | 36 | 182 | 140 |
| Nicrome | 0.635 | 8 × 8 | 64 | 11 | 4.6 | 20 | 118 | 110 |
| Nickel | 0.127 | 80 × 80 | 52 | 11 | 4.6 | 25 | 98 | 92 |

What is claimed is:

1. A method comprising:
   providing at least two structures comprising a resin incapable of being melted or cured in an induced magnetic field, said structures being reinforced with a substantially planar two dimensional array of electrically conductive fibers within the resin, said array being capable of being heated by an induced magnetic field so as to melt or cure said resin;
   applying a preferential heating material to said structures, said material being capable of coupling with or responding as a susceptor to said magnetic field and being substantially heated thereby;
   overlapping said structures to which the preferential heating material has been applied;
   orienting said structures within said magnetic field such that but for the application of said preferential heating material, the resin of said structures would not be sufficiently heated by said magnetic field as to be melted or cured; and
   simultaneously applying pressure to said overlapping structures and heating the preferential heating material applied thereto by said magnetic field thereby melting or curing said resin and joining the overlapping the structures together.

2. The method of claim 1 wherein said resin is polyetherketoneketone.

3. The method of claim 1 wherein said resin is a pyromellitic diethyl ester diacid/1,4-bis(4-aminophenoxy)-2-phenylbenzene mixture.

4. The method of claim 1 wherein said heating material is magnetic and electrically conductive.

5. The method as defined in claim 4 wherein said heating material is nickel.

6. The method of claim 1 wherein said heating material is nonmagnetic and electrically conductive.

7. The method of claim 4 or 6, said heating material being particles incorporated within said structure.

8. The method of claim 4 or 6 wherein said structure has at least one surface, said heating material being on said surface.

9. The method of claim 4 or 6 wherein said heating material is a screen.

10. The method of claim 4 or 6 wherein said heating material is a foil.

11. The method of claim 1, 4, or 6 wherein said fibers are carbon fibers.

* * * * *